No. 763,503. Patented June 28, 1904.

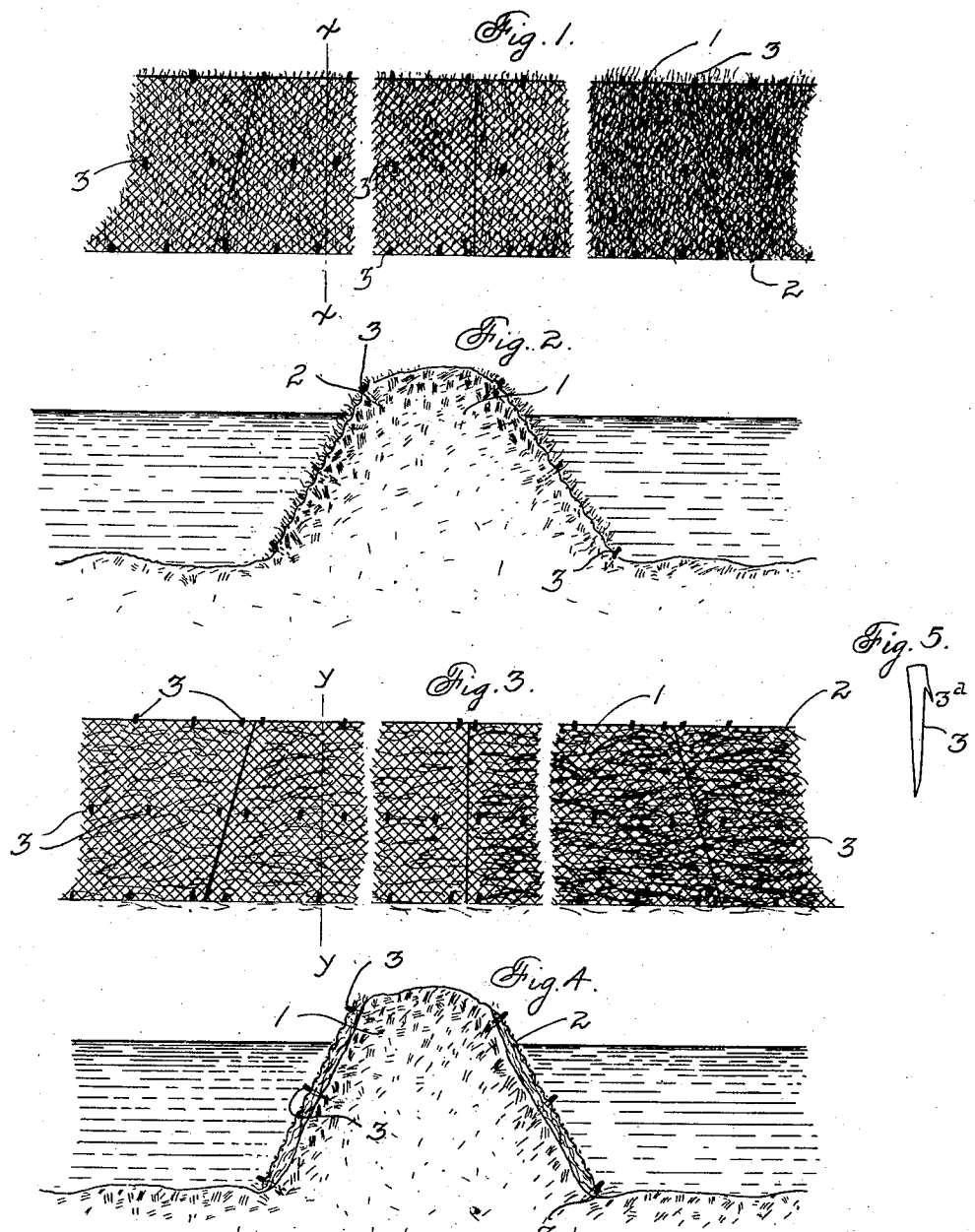

UNITED STATES PATENT OFFICE.

ROBERT B. McGREGOR, OF CREWS, MISSISSIPPI.

REVETMENT.

SPECIFICATION forming part of Letters Patent No. 763,503, dated June 28, 1904.

Application filed February 27, 1904. Serial No. 195,577. (No model.)

*To all whom it may concern:*

Be it known that I, ROBERT B. McGREGOR, a citizen of the United States, residing at Crews, in the county of Tunica and State of Mississippi, have invented certain new and useful Improvements in Revetments; and I do hereby declare the following to be a full, clear, and exact description of the invention, such as will enable others skilled in the art to which it appertains to make and use the same.

My invention relates to revetments.

It has for its object to protect levees from washing or shifting and to that end to provide a protector which is much simpler and cheaper than those now in use and at the same time is effective and performs the office for which it is intended.

The invention consists in the construction and combination of parts hereinafter described, and more particularly pointed out in the claim.

In the accompanying drawings, illustrating the preferred embodiment of my invention, Figure 1 is an elevation of an embankment provided with my preferred protector. Fig. 2 is a transverse sectional view on line $x\ x$ of Fig. 1. Fig. 3 is an elevation of an embankment provided with another protector. Fig. 4 is a transverse sectional view on line $y\ y$ of Fig. 3, and Fig. 5 is a detail view of one of the pegs.

Referring more particularly to the drawings, 1 is a levee or embankment which has been sodded, preferably with Bermuda grass. As is commonly known, by sodding a bank it will prevent its washing or shifting to a great extent as compared to a loose embankment. The sod, however, is liable itself to be shifted unless some means is provided for holding it in place.

My invention consists in placing a wire-netting 2 against the sod, securing the same by means of stakes 3 or any other suitable means. The sod and the netting should preferably extend some distance below the water-level, as well as above it. The netting is placed on the bank as soon as it is sodded, and the grass will grow up through the meshes of the wire and become so matted therein that it will be securely retained in position by said netting. The stakes are preferably made with a tooth $3^d$, adapted to engage and pin the wire to the embankment. These pegs are placed along the edges of the wire-netting, which comes in rolls of two or three hundred feet, and a third row is placed in the middle to prevent the netting from being raised when the waves strike it.

While I denominate the wire material a "netting," it will be understood that the mesh is of such size that one or more stalks of the grass as it grows will extend up through said meshes. It is obvious that a bank or levee provided with this protector, in which only the grass will show, will present a much better and more artistic appearance than one in which mattresses of straw, branches, &c., are used.

As shown in Figs. 3 and 4, a new embankment may, if sod is not accessible, be sowed with grass and mattresses of straw, bushes, branches, &c., either loose or in bunches, temporarily placed over the banks below the wire-netting. When the grass has sprouted so that the blades extend above the soil, the mattresses can be removed.

Latitude is allowed herein as to details, as they may be changed at will and the spirit of my invention remain intact and be protected.

Having thus described my invention, what I claim as new, and desire to secure by Letters Patent, is—

In a revetment, the combination with a wire-netting applied to an embankment, of blades of growing grass extending through the meshes of said netting.

In testimony whereof I affix my signature in presence of two witnesses.

ROBERT B. McGREGOR.

Witnesses:
JOHN F. BELOTE,
M. J. MILLER.